US012793208B2

(12) United States Patent
Schoebinger et al.

(10) Patent No.: US 12,793,208 B2
(45) Date of Patent: Nov. 10, 2026

(54) COMPUTER-IMPLEMENTED METHOD FOR PERFORMING AT LEAST ONE MEASUREMENT USING MEDICAL IMAGING, DATA PROCESSING DEVICE AND ELECTRONICALLY READABLE STORAGE MEDIUM

(71) Applicant: Siemens Healthineers AG, Forchheim (DE)

(72) Inventors: Max Schoebinger, Hirschaid (DE); Felix Lades, Erlangen (DE); Ruediger Schernthaner, Vienna (AT)

(73) Assignee: Siemens Healthineers AG, Forchheim (DE)

( * ) Notice: Subject to any disclaimer, the term of this patent is extended or adjusted under 35 U.S.C. 154(b) by 525 days.

(21) Appl. No.: 17/951,479

(22) Filed: Sep. 23, 2022

(65) Prior Publication Data

US 2023/0102441 A1 Mar. 30, 2023

(30) Foreign Application Priority Data

Sep. 27, 2021 (EP) .................................... 21199198

(51) Int. Cl.
*G06T 7/00* (2017.01)
*G06V 10/60* (2022.01)

(52) U.S. Cl.
CPC ............ *G06T 7/0012* (2013.01); *G06V 10/60* (2022.01); *G06T 2207/30101* (2013.01); *G06T 2207/30204* (2013.01)

(58) Field of Classification Search
CPC ......... G06T 7/0012; G06T 2207/30101; G06T 2215/06; A61B 6/504; A61B 6/032
See application file for complete search history.

(56) References Cited

U.S. PATENT DOCUMENTS 8,620,040 B2 12/2013 Grosskopf
2010/0166283 A1* 7/2010 Grosskopf ............ A61B 6/466 382/131

(Continued)

FOREIGN PATENT DOCUMENTS

EP 3828836 A1 6/2021

OTHER PUBLICATIONS

Guy A. Lavi "Mapping the coronary arteries on a sphere in CT angiography", Proc. SPIE 5367, Medical Imaging 2004: Visualization, Image-Guided Procedures, and Display, (May 5, 2004); https://doi.org/10.1117/12.534571 (Year: 2004).*

(Continued)

*Primary Examiner* — Emily C Terrell
*Assistant Examiner* — Jacqueline R Zak
(74) *Attorney, Agent, or Firm* — Harness, Dickey & Pierce, P.L.C.

(57) ABSTRACT

A computer-implemented method for performing at least one measurement in an anatomical vessel structure in an imaging region, the vessel structure comprising multiple vessels of interest for the measurement, the method comprises receiving a three-dimensional image data set of the imaging region; determining a two-dimensional unfolded image of the vessel structure from the image data set; displaying the unfolded image to the user; determining at least one landmark in the vessel structure and visualizing the at least one landmark at a corresponding landmark position in the unfolded image; performing the at least one measurement based on the at least one landmark and the three-dimensional image data set; and displaying the result of the at least one measurement in the unfolded image in a user presentation or together with the unfolded image in the user presentation.

21 Claims, 4 Drawing Sheets

(56) References Cited

U.S. PATENT DOCUMENTS

| | | | | |
|---|---|---|---|---|
| 2012/0014573 | A1* | 1/2012 | Lautenschlager | G06T 7/10 382/128 |
| 2012/0136236 | A1 | 5/2012 | Roberts | |
| 2013/0066188 | A1* | 3/2013 | Taerum | G06T 7/0012 600/407 |
| 2015/0272448 | A1 | 10/2015 | Fonte et al. | |
| 2021/0166342 | A1 | 6/2021 | Lades et al. | |

OTHER PUBLICATIONS

Egger, G. et al.: "Aorta Segmentation for Stent Simulation", in: MICCAI Workshop on Cardiovascular Interventional Imaging and Biophysical Modelling 2009, arXiv: 1103.1773.

Ghesu, Florian et al. "Multi-Scale Deep Reinforcement Learning for Real-Time 3D-Landmark Detection in CT Scans", IEEE, 2017, vol. 41, Nr. 1, pp. 1-14 (pp. 176-189); 2017.

Kanitsar, Armin et al. "CPR—Curved Planar Reformation"; Published by IEEE Visualization Oct. 27, 2002-Nov. 1, 2002. Boston, MA, USA (pp. 37-44).

Hu, D.K. et al.: "Repair of abdominal aortic aneurysms: preoperative imaging and evaluation", in: Cardiovasc Diagn Ther 2018; 8 (Suppl 1), 2018, pp. 157-167.

Bui VY et al:"Improving multi-atlas cardiac structure segmentation of computed tomography angiography: A performance evaluation based on a heterogeneous dataset", Computers in Biology and Medicine 125 (2020) 104019, p. 1-12, DOI org/10.1016/j.compbiomed. 2020 104019; XP086331247.

Choi Gilwoo et al:; "Methods for Characterizing Human Coronary Artery Deformation From Cardiac-Gated Computed Tomography Data", IEEE Transactions on Biomedical Engineering, IEEE, USA, vol. 61, No. 10, Oct. 1, 2014 (Oct. 1, 2014), pp. 2582-2592, XP011559074; ISSN: 0018-9294, DOI: 10.1109/TBME.2014. 2323333 [retrieved on Sep. 16, 2014].

* cited by examiner

COMPUTER-IMPLEMENTED METHOD FOR PERFORMING AT LEAST ONE MEASUREMENT USING MEDICAL IMAGING, DATA PROCESSING DEVICE AND ELECTRONICALLY READABLE STORAGE MEDIUM

CROSS-REFERENCE TO RELATED APPLICATION(S)

The present application claims priority under 35 U.S.C. § 119 to European Patent Application No. 21199198.9, filed Sep. 27, 2021, the entire contents of which are incorporated herein by reference.

FIELD

One or more example embodiments of the present invention concerns a computer-implemented method for performing at least one measurement in an anatomical vessel structure in an imaging region, the vessel structure comprising multiple vessels of interest for the measurement, wherein the measurement is performed in a three-dimensional image data set of the imaging region. One or more example embodiments of the present invention further concerns a data processing device, a computer program and an electronically readable storage medium.

BACKGROUND

In medicine, an often-appearing problem are measurements in a vessel structure, which may also be called tubular structure. This usually concerns blood vessels, such that such a vessel structure may belong to a blood vessel tree. However, the vessel structure may also be part of or comprise an airways tree. Measurements may, for example, comprise diameter measurements, volume measurements, length measurements and the like at one or more landmarks. However, such vessel structures usually have a complex three-dimensional geometry, in particular when more than one vessel is of interest for the measurement.

In the example of blood vessels, there are various diseases and conditions which can lead to the necessity of interventions, for example atherosclerosis, dissections or aneurysms. In particular, implants may be positioned in at least one blood vessel, for example, in the case of large aortic aneurysms, stent grafts are placed interventionally to bridge the diseased section of the vessel. The planning of such implant placement procedures, in particular stent or stent graft placement procedures, can be complex and involve many measurements to be performed in the relevant vessel structure comprising the vessels of interest. Usually, such measurements are performed on pre-interventionally acquired image data, that is, using a three-dimensional image data set of an imaging region comprising the vessel structure. For example, such an image data set may be a computed tomography (CT) angiography data set. The results of the measurements can then be used to select the best suited implant, for example stent graft, for the patient, to create patient-specific, customized implants, or to otherwise plan an intervention.

Performing such measurements in a three-dimensional image data set, in particular to plan an intervention, is usually a highly interactive process largely depending on the skill of the user and having a high inter-user variability. In the following, an example, regarding the pre-procedural planning of abdominal aortic aneurysm stent placement will be discussed as an exemplary use-case, however, the principles and shortcomings of these approaches also apply to other measurements in vessel structures, as discussed above, for example regarding the planning of thoracic aneurysm stent graft or coronary artery stents in complex lesions as well as the use of other implants and/or other regions of interest.

Measurements regarding the planning of such interventional procedures have complex requirements. For example, a user has to recognize and identify anatomical locations as landmarks, which drive the consistent evaluation of multiple measurements. Examples for such landmarks are, regarding stent placement for abdominal aortic aneurysms, the lower edge of the lowest renal artery ostium, start and end points of the aneurysm, the aortic bifurcation, the iliac artery bifurcation, the point of maximal narrowing of the aneurysm and more. Furthermore, consistent length measurements have to be performed based on the defined landmarks.

After two landmarks have been defined, the length along the blood vessel between these two points may be evaluated. Examples are the length of the aneurysm, the aortic neck length, the length of the "landing zone" of the stent and the like. As a third requirement, diameter measurements have to be performed. In order to reflect the true diameter of the vessel at a given location, the measurement orientation must be consistent with the course of the vessel, such that measurements should not be performed in an oblique cross section. Finally, the measurements all have to be documented in a manner such that they are comprehensible and appear trustworthy to persons working with the results. In particular, re-assessment of a case should be prevented. Hence, the documentation should include meaningful images which provide the anatomical context of the measurements together with the measurements itself.

Such measurements are typically performed on evaluation work stations, which may be connected to a picture archiving and communication system (PACS). To facilitate measurements in a three-dimensional image data set, various tools have already been proposed in the state of the art.

For example, distance measurements may be performed on multi planar reformations (MPRs). Here, the user is angulating oblique planes in the image data set and then performs straight distance line measurements on the resulting planar views. However, such measurements are only approximations of the true length along the vessel, since the curved nature of the vessels is not taken into account. Such a technique may also be used for interactive measurement of diameters of vessels. In both cases, a highly interactive procedure with a high degree of inter-user variability results.

In an improved approach, it was proposed to perform measurements on so-called curved planar reformations (CPRs). The vessel centerlines are determined and used to render the whole course of a single vessel of interest in one view. The resulting CPRs then provide the ability to measure length along the centerline, which better reflects the true length along the vessel. However, CPRs only allow measurements and evaluations regarding a single vessel. If a landmark is identified in one vessel, it has to be re-identified in other vessels as well, resulting in another source of variation and errors. Regarding CPR, it is referred to, for example, the article by A. Kanitsar et al., "CPR—Curved Planar Reformation", IEEE Visualization, 2002.

Measurements may further be performed in cross-sectional views. On a typical PACS work station, cross-sectional views are, however, not provided automatically, but the user has to angulate oblique planes to obtain cross-sectional images. Due to the curved nature of the vessels, the user has to correct the angulation for each point along the vessel path where they want to measure a diameter. The angulation of the oblique planes is highly subjective and prone to error. Hence, more advanced work stations have been proposed which offer the user the ability to navigate along the vessel in a cross-sectional view automatically. Tools can be used to manually measure diameters. However, measurement positions also have to be defined manually.

Regarding documentation, it is known to provide snapshots of the individual measurements together with a listing of the measurements in generic schematic views. Hence, it is difficult to read and understand, in particular correlate, the elements of the documentation.

Even if workflow support guiding the user through the sequence of steps to perform all the measurements, it is still a time-consuming process where inconsistencies between measurements may cause variations and may lead to inappropriate implant sizing. This, in turn, may lead to a sub-optimal result of the interventional procedure, for example acquiring additional devices to be implanted during either the same or a follow-up procedure.

Generally, regarding abdominal aortic aneurysms, it is referred to an article by D. K. Hu et al., "Repair of abdominal aortic aneurysms: preoperative imaging and evaluation", Cardiovasc Diagn Ther 2018; 8 (Suppl 1), 2018, pages 157-167.

SUMMARY

It is an object of one or more example embodiments of the present invention to provide means for improving measurements in image data sets, in particular for planning interventional procedures.

According to one or more example embodiments, a computer-implemented method for performing at least one measurement in an anatomical vessel structure in an imaging region, the vessel structure comprising multiple vessels of interest for the measurement, comprises receiving a three-dimensional image data set of the imaging region; determining a two-dimensional unfolded image of the vessel structure from the image data set; displaying the unfolded image to the user; determining at least one landmark in the vessel structure and visualizing the at least one landmark at a corresponding landmark position in the unfolded image; performing the at least one measurement based on the at least one landmark and the three-dimensional image data set; and displaying the result of the at least one measurement in the unfolded image in a user presentation or together with the unfolded image in the user presentation.

According to one or more example embodiments, the determining the at least one landmark determines the at least one landmark at least partly based on at least one of user interaction data of a user interaction with the unfolded image or by a landmark detection algorithm.

According to one or more example embodiments, the method further includes determining vessel structure information using at least one evaluation algorithm, the vessel structure information describing at least one of a course of the vessels of interest or dimensions of the vessels of interest from the image data set, wherein at least one of the determining the unfolded image or the performing the measurement is at least partly based on the vessel structure information.

According to one or more example embodiments, the determining vessel structure information includes determining at least one of, centerlines of the vessels of interest, or a lumen information describing the lumen of the vessels of interest.

According to one or more example embodiments, the at least one measurement relates to at least one disease, wherein the lumen information is determined based on a presence of the at least one disease.

According to one or more example embodiments, the method further includes displaying at least a part of the vessel structure information in the unfolded image.

According to one or more example embodiments, the method further includes determining, for at least one landmark, at least one additional two-dimensional display image at the landmark position; and displaying the at least one additional two-dimensional display image adjacent to the unfolded image in the user presentation.

According to one or more example embodiments, the at least one additional two-dimensional display image is a sectional image of the vessel of interest in which the landmark is located.

According to one or more example embodiments, the result of the at least one measurement is related to vessel structure information, derived from the image data set and underlying the at least one measurement at the landmark.

According to one or more example embodiments, the method further includes modifying at least one of at least one displayed landmark position or displayed vessel structure information based on user modification information determined from interaction of the user therewith in the user presentation.

According to one or more example embodiments, the modifying includes updating each of the at least one measurement based on at least one of the respective landmark or vessel structure information.

According to one or more example embodiments, the determining the unfolded image includes selecting a set of input points in the three-dimensional image data set, wherein the set of input points comprises a first plurality of input points that represents the vessel structure, determining a projection surface with respect to the three-dimensional image data set, calculating a set of surface points of the projection surface, wherein for each input point of a set of input points, a corresponding surface point of the set of surface points is calculated based on a projection of the corresponding input point onto the projection surface, calculating a deformed projection surface by applying a deformation algorithm onto the projection surface, the set of input points and the set of surface points, wherein each surface point of the set of surface points is moved to the corresponding input point of the set of input points, calculating a set of voxel positions with respect to the three-dimensional image data based on the deformed projection surface, and calculating the two-dimensional unfolded image of the vessel structure based on the three-dimensional image data set and the set of voxel positions.

According to one or more example embodiments, the unfolded image includes at least a part of at least one of a surrounding anatomy in the imaging region or a surrounding anatomy for at least one additional anatomical structure, and the determining the unfolded image determines the unfolded image excluding the at least the part of at least one of the surrounding anatomy in the imaging region or the surrounding anatomy for the at least one additional anatomical structure and at least one indicator describing at least one of a position or dimensions of the at least the part of at least one of the surrounding anatomy in the imaging region or the surrounding anatomy for the at least one additional anatomical structure is overlaid over the unfolded image.

According to one or more example embodiments, the additional anatomical structure is a vessel not of interest for the at least one measurement, the vessel not of interest overlaps or crosses at least one of the vessels of interest of the vessel structure, and the indicator describes at least one of a course of the vessel not of interest or dimensions of the vessel not of interest.

According to one or more example embodiments, a data processing device for performing at least one measurement in an anatomical vessel structure in an imaging region, the vessel structure comprising multiple vessels of interest for the measurement, comprises a display device; an interface configured to receive a three-dimensional image data set of the imaging region; an unfolding unit configured to determine a two-dimensional unfolded image of the vessel structure from the image data set; a display unit configured to display the unfolded image to the user; a landmark unit configured to determine at least one landmark in the vessel structure and visualize the at least one landmark at a corresponding landmark position in the unfolded image; and a measurement unit configured to perform the at least one measurement based on the at least one landmark and the three-dimensional image data set, wherein the display unit is further configured to display the result of the at least one measurement in the unfolded image in a user presentation or together with the unfolded image in the user presentation.

According to one or more example embodiments, the data processing device further comprises at least one of: an evaluation unit configured to determine vessel structure information describing at least one of a course of the vessels of interest or dimensions of the vessels of interest from the image data set using at least one evaluation algorithm, wherein at least one of (i) the unfolding unit is configured to use at least a part of the vessel structure information for determining the unfolded image or (ii) the measurement unit is configured to use at least a part of the vessel structure information for performing the measurement; or a user input device and a user interaction unit configured to determine user interaction data of a user interaction with the unfolded image, wherein the landmark unit is configured to use the user interaction data to determine at least one of the at least one landmark, user modification information regarding at least one displayed landmark position, or displayed vessel structure information and determined from interaction of the user therewith in the user presentation, wherein a modification unit of the data processing device is configured to modify at least one of the at least one landmark position or the displayed vessel structure information according to the user modification information.

According to one or more example embodiments, a non-transitory computer readable medium having instructions that, when executed by a data processing device of a system, causes the system to perform a method According to one or more example embodiments.

BRIEF DESCRIPTION OF THE DRAWINGS

Objects and features of one or more example embodiments of the present invention will become apparent from the following detailed description considered in conjunction with the accompanying drawings. The drawings, however, are only principle sketches designed solely for the purpose of illustration and do not limit the invention. The drawings show.

DETAILED DESCRIPTION

Figure 1:
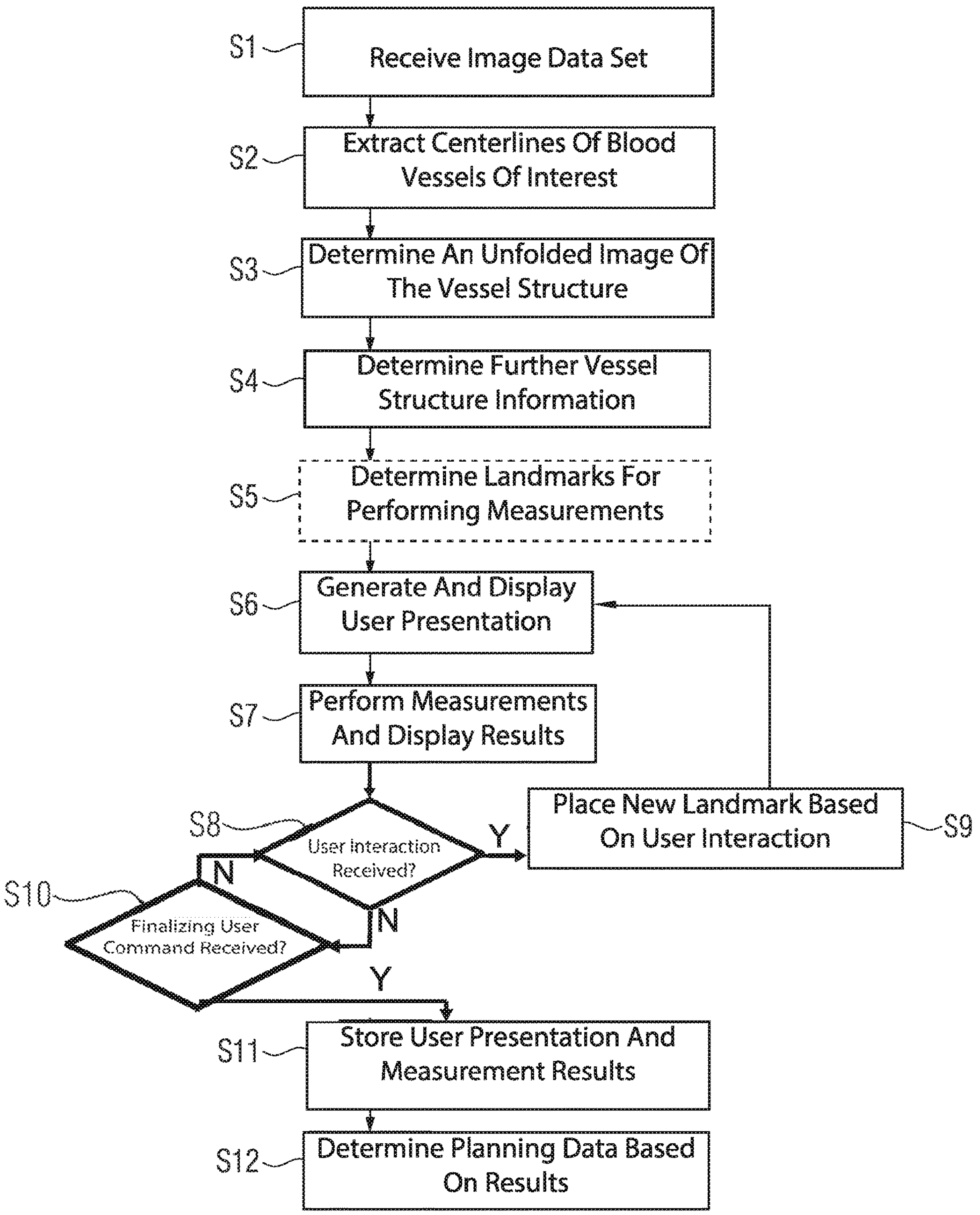
FIG. 1 a flowchart of an embodiment of a method according to the invention.

In a computer implemented method for performing at least one measurement in an anatomical vessel structure in an imaging region, the vessel structure comprising multiple vessels of interest for the same measurement, according to one or more example embodiments of the present invention, the method comprises:

receiving a three-dimensional image data set of the imaging region, from the image data set, determining a two-dimensional unfolded image of the vessel structure, displaying the unfolded image to the user, determining at least one landmark in the vessel structure and visualizing the at least one landmark at a corresponding landmark position in the unfolded image, performing the at least one measurement based on the at least one landmark and the three-dimensional image data set, and displaying the result of the at least one measurement in or together with the unfolded image in a user presentation.

In preferred embodiments, the vessels may be blood vessels, such that the three-dimensional image data set is an angiography data set. In particular, computed tomography may be used to acquire the angiography data set. Typically, when acquiring such three-dimensional image data sets, at least one contrast agent is used to clearly show the vessels and the vessel structure. Alternatively, the vessels may also be airway vessels. Generally, the measurements may be performed in a process for planning an interventional procedure in the vessel structure, in particular placing an implant. Hence, the multiple vessels of interest may be defined as relevant for such an intervention. The vessel structure, which is, in particular, part of a corresponding vessel tree, in this case comprises the multiple vessels of interest, while, however, the vessel tree may, of course, comprise further vessels (not of interest). The vessels of interest are usually directly connected via bifurcations and/or ostia.

As in principle known from the state of the art, the at least one measurement may, for example, comprise determining the length of a vessel of interest between two landmarks and/or at least one diameter of the vessel of interest at at least one landmark and/or at least one angle between two vessels at a bifurcation and/or at least one lumen and/or disease information for a vessel of interest at at least one landmark. Regarding the diameter, for example, a maximum diameter, a minimum diameter and/or an average diameter may be determined since the vessel cross section is, typically, not perfectly circular.

According to one or more example embodiments of the present invention, an improved workflow is proposed in which all relevant measurements may be displayed together with the relevant anatomical landmarks in a single user presentation, providing a comprehensive anatomical overview. This is facilitated by displaying the vessel structure in an unfolded view using the unfolded image. An unfolded image is a view wherein the courses of all vessels of interest are clearly shown two-dimensionally without overlapping. Due to the nature of such unfolded views, the user doesn't have to switch between different vessels of interest. This leads to improved efficiency, since the user can always stay focused on the anatomy and does not need to reorient views when measuring in different vessels of interest. Furthermore, improved documentation and communication is achieved, since the working environment in which the measurements are performed also serves as a documentation tool, since a snapshot of the user presentation is sufficient to document the results. In this way, a person receiving the measurements can assess all results in one view and gets the same impression as the user performing the measurements. In other words, the unfolded image serves as a global view onto the vessel structure, in particular vascular anatomy, facilitating efficient navigation along multiple vessels of interests simultaneously.

In concrete embodiments, at least one landmark of the at least one landmark may be determined at least partly based on user interaction data of a user interaction with the unfolded image and/or at least partly by a landmark detection algorithm. For example, the user may place the relevant anatomical landmarks interactively using the display of the unfolded image. In other embodiments, the positions of at least a part of the landmarks may be precomputed using at least one landmark detection algorithm. Due to the display of the at least one landmark in the unfolded image, the user may easily review the position. In particular, as further discussed below, by interacting with the unfolded image and the landmarks shown therein, landmark positions may also be adapted by the user.

To automatically detect landmarks in three-dimensional image data sets, corresponding landmark detection algorithms have already been proposed in the art, for example based on artificial intelligence. As an example, it is referred to an article by Florin C. Ghesu et al., "Multi-Scale Deep Reinforcement Learning for Real-Time 3D-Landmark Detection in CT Scans", IEEE Transactions on Pattern Analysis and Machine Intelligence 41, 2019, pages 176-189.

Preferably, vessel structure information describing the course and/or dimensions of the vessels of interest may be determined from the image data set by at least one evaluation algorithm, wherein the vessel structure information is at least partly used for determining the unfolded image and/or performing the measurement. However, in embodiments, vessel structure information may also additionally be provided by the user, for example by marking a centerline not detected by the evaluation algorithm in the three-dimensional image data set, and/or vessel structure information may be modified by a user. In such embodiments, preferably, the three-dimensional image data set may also be at least partly displayed to the user, such that the user can interact with the displayed three-dimensional image data set. Regarding the at least one evaluation algorithm, preferably, vessel structure information may be used both for determining the unfolded image and for performing the measurement.

In preferred embodiments, as a vessel structure information, centerlines of the vessels of interest, in particular for measuring a length along the centerline, and/or a lumen information describing the lumen of the vessels of interest, in particular for measuring at least one diameter, are determined. For example, vessel centerlines may be automatically extracted from the three-dimensional image data set, such that the centerlines representing the course of at least the vessels of interest may be used as vessel structure information. Evaluation algorithms to determine centerlines of vessels, for example blood vessels in angiography data sets, are already known in the art, for example as centerline tracing algorithms, and may also be employed in the current invention. If not all relevant vessels, that is, vessels of interest, are identified automatically and/or correctly, the user may be enabled to add additional centerlines interactively and/or correct centerlines, as already discussed above.

While information regarding the centerlines may be useful for both determining the unfolded image and measurement, for example of vessel lengths between landmarks, lumen information describing the lumen of the vessels of interest is particularly beneficial when determining diameters of vessels and/or disease information for a vessel of interest. Here, corresponding evaluation algorithms have also already been proposed in the state of the art. Exemplarily, it is referred to U.S. Pat. No. 8,620,040 B2.

Preferably, if the measurement relates to at least one disease, the lumen information may be determined taken into account the presence of the disease. In particular, diseased areas, in particular occluded parts of the lumen, may be determined in addition to a patent lumen and/or a boundary of the vessel of interest may be determined to include both parts occluded by the disease and parts free from occlusion. Hence, in particular, depending on the clinical question, a lumen segmentation may be extended to cover areas occluded by a disease to be evaluated. For example, the corresponding evaluation algorithm may be enabled to segment the outline of an aortic aneurysm thrombus region, allowing to quantify not only the diameter of the patent lumen, but of the entire aneurysm sac including the thrombus formation within the sac. This is, for example, discussed in an article by G. Egger et al. "Aorta Segmentation for Stent Simulation", MICCAI Workshop on Cardiovascular Interventional Imaging and Biophysical Modelling 2009, arXiv: 1103.1773. Also taking into account occluded parts of the vessel lumen may be particularly important for planning implants.

In preferred embodiments, at least a part of the vessel structure information, in particular centerlines and/or vessel boundaries, is also displayed in the unfolded image and/or otherwise in the user presentation. This allows to also visualize the basis for at least some of the measurements, such that the user can also assess the reliability of this information and, in particular, if an error is discovered, interactively correct vessel structure information.

In an especially preferred embodiment, for at least one, in particular each, landmark, at least one additional two-dimensional display image at the landmark position may be determined and displayed adjacent to the unfolded image in the user presentation. In particular regarding measurements which may not be assessed on the basis of the unfolded image only, it can be advantageous to add additional images which may be customized for at least one of the at least one measurement to be performed at the landmark position. For example, the display image may be a sectional image of the vessel of interest in which the landmark is located, in particular perpendicular to its centerline according to the vessel structure information. This is particularly advantageous regarding the measurement of diameters and also, if a lumen information is determined as vessel structure information, for the, in particular interactive, display of boundaries of the vessel.

Hence, generally, the result of at least one measurement related to a landmark and/or additional information, in particular a part of the vessel structure information, derived from the image data set and underlying the measurement at the landmark may be displayed within and/or associated with the display image associated with the landmark. In this manner, as already indicated, results and/or additional information, in particular vessel structure information, may be visualized in one common user presentation, providing a total overview and context as well as the possibility for interaction on the side of the user, for example to correct/adapt landmark positions and/or vessel structure information.

In particular, if the landmark positions are at least in part user-defined, with each new landmark being defined by the user, the corresponding display image, in particular a sectional view of the vessel at the landmark position, may be calculated and displayed in the user presentation. In particular, vessel structure information and/or measurement results, if already available, may also instantly be added, for example contours of a lumen in a cross-sectional image and/or respective diameters. Due to the specific composition of display images in combination with the unfolded image, all the measurements and relevant anatomical landmarks are displayed in a single user representation. The basis on which the measurements have been performed is visualized directly in the anatomical context within which they have been defined. It is thus immediately comprehensible whether the measurements are correct or not. Immediately showing the display image after the landmark has been placed allows a user to immediately judge whether the location is correct, in particular, if it is related to disease and/or other anatomical, in particular characteristic, features.

It is noted that, while the measurement accuracy is already improved by deriving all measurements based on the landmark positions and the three-dimensional image data set, the use of automatically computed display images also adds to reliable, consistent results. Imprecisions due to slightly different measurement/marker positions or incorrect cross-sectional views provided by manual angulation of oblique views on PACS workstations can be excluded by design.

Using display images provides a unique combination of a global view, that is the unfolded image, with, in particular multiple, local views. The unfolded image serves as a global view onto the vessel anatomy, facilitating efficient navigation along multiple vessels of interest simultaneously. The display images serve as a local view into the vessels at the landmark positions. The allow for precise local positioning and measurements.

As already mentioned, particularly advantageous embodiments result if landmark positions and/or vessel structure information can be modified interactively by the user. That is, preferably, at least one displayed landmark position and/or displayed vessel structure information may be modified according to user modification information determined from interaction of the user therewith in the user presentation. For example, landmarks and/or vessel structure information may be modified by using a cursor or the like to select the item to be modified and then, for example, drag it to the new position and/or perform other interactions to accordingly modify the information. If, for example, from lumen information, a vessel contour is shown in a display image, sections of the contour may be drawn to their correct positions by the user, if there was an error in the segmentation result. In other words and generally, the user presentation can also be seen as a user interface.

In preferred embodiments, upon modification of the at least one landmark position and/or the vessel structure information, each measurement based on the respective landmark and/or vessel structure information may be updated and displayed. Of course, if display images are used, upon modification of the landmark position, the corresponding display image may also be updated. In summary, all measurements and visualizations may be updated instantly with the current definition of the landmarks, i.e., their positions, and the vessel structure information.

Several approaches to determine an unfolded image have already been proposed in the art. In preferred embodiments, the unfolded image may be determined by a projection process, wherein input points representing the vessel structure are projected onto a projection surface resulting in surface points on the projection surface, such that the projection surface may be deformed and the image information as a whole may be projected onto the deformed projection surface. In a concrete embodiment, the unfolded image may be determined by

- selecting a set of input points in the three-dimensional image data set, wherein the set of input points comprises a first plurality of input points that represents the vessel structure,
- determining a projection surface with respect to the three-dimensional image data set,
- calculating a set of surface points of the projection surface, wherein for each input point of the set of input points a corresponding surface point of the set of surface points is calculated based on a projection of that input point onto the projection surface,
- calculating a deformed projection surface by applying a deformation algorithm onto the projection surface, the set of input points and the set of surface points, wherein each surface point of the set of surface points is moved to the corresponding input point of the set of input points,
- calculating a set of voxel positions with respect to the three-dimensional image data based on the deformed projection surface, and
- calculating the two-dimensional unfolded image of the vessel structure based on the three-dimensional image data set and the set of voxel positions.

Such an approach is, for example, described in EP 1 828 836 A1, such that the concrete embodiments described therein may also be applied in the current invention. In particular, the set of input points can comprise, for example, for every vessel of interest at least one input point that is located on a centerline of that vessel. Each input point of the set of input points can be, for example, located on the centerline of a corresponding vessel of the plurality of vessels of interest, such that, in a first step, centerlines may be determined as vessel structure information, which may then be employed to define the input points.

Further, in preferred embodiments, the projection surface may be of smooth geometry and comprise a regular mesh. In particular, the projection surface may be determined based on a mean-shape model of the vessel structure and/or based on a mean-shape model of an organ to which the vessel structure relates, for example the heart. Furthermore, the deformation algorithm may be based on an As-Rigid-As-Possible surface model.

Of course, other approaches to providing an unfolded image may also be employed in the current invention. For example, approaches based on ray casting or stitching together curved views have also been proposed.

In the preferred approach using projection of input points onto to a projection surface, however, one of the advantages is that the anatomy is also visualized, providing a better orientation for the user when watching the image.

As already mentioned, the user presentation provides a good basis for a comprehensible, clear and understandable documentation of the measurements. Preferably, in particular after receiving a finalizing user command, the user presentation, in particular together with the results of the measurement, is stored as or in a report regarding the measurement. In particular regarding the use of display images additional to the unfolded image, the combined view serves as an advantageous basis for documentation and communication of the measurements. The basis on which the measurements have been performed is visualized directly in the anatomical context, such that a person receiving the report may easily check the reliability of the results. In particular, for example, a snapshot of the user representation may be sufficient to document all results. In particular, by using the final user presentation, the receiving person sees exactly the same as what the user saw on screen when performing the measurement.

Preferably, planning data describing at least one medical intervention to be performed in the vessel structure and/or parameters describing at least one implant to be implanted in the vessel structure may be determined based on the results of the at least one measurement. For example, if the implant is a stent or stent graft, measurements may be performed whose results may be used to customize a stent to be used in the vessel structure and/or to choose a stent from multiple available sizes.

In this context, in preferred embodiments, the at least one measurement to be performed may be defined based on, in particular manufacturer-specific, requirement data describing measurement information required to determine the parameters of the at least one implant. The implant may, for example, be a stent and/or stent graft. Preferably, measurements regarding a stent and/or stent graft may comprise the length of the aneurysm to be treated, the length of a vessel of interest comprising the aneurysm as well as the landing zones to other vessels of interest, the smallest diameter of the aneurysm as well as diameters at the start and the end of the aneurysm, and dimensions of neighboring vessels of interest.

In an exemplary concrete embodiment of the method according to the invention, for example, in a first step, centerlines as vessel structure information may be determined using a first evaluation algorithm, whereafter, in a second step, the unfolding image may be determined based on the centerlines. In a third step, lumen information may be determined as vessel structure information using a second evaluation algorithm. In a fourth step, the anatomical landmarks may be determined, in particular at least partly based on user interaction data. For each landmark thus defined a sectional image may be calculated and displayed in the user presentation as a display image. In the display image, contours taken from the lumen information may also be shown. For each measurement, once all landmarks relevant for the measurement have been placed, the measurement is automatically performed, in particular at least partly by using the vessel structure information. The measurement results are also displayed in the user presentation.

The resulting comprehensive view may be used to modify landmark positions and/or vessel structure information based on user interaction with the user presentation, wherein updates are performed after each modification. Finally, after a finalizing user command, the current user presentation may be stored as a report together with the measurement results.

In preferred embodiments, as already shortly discussed, the unfolded image also shows at least a part of a surrounding anatomy in the imaging region and/or, for at least one additional anatomical structure, the unfolded image is determined excluding the additional anatomical structure and at least one indicator describing the position and/or dimensions of this additional anatomical structure is shown positionally accurately overlaid over the unfolded image. In a concrete embodiment, the additional anatomical structure may be a vessel not of interest for the measurement, which in particular overlaps or crosses at least one of the vessels of interest of the vessel structure, and the indicator describes the course and/or dimensions of this vessel. In other words, additional anatomical information may be pre-segmented and displayed as overlays to the unfolded image. For example, the bifurcation and projected course of at least one vessel not of interest may be displayed as a dotted line instead of including it into the computation of the unfolded image. Such customizations are helpful to avoid artefacts created by ambiguities during vessel unfolding. It is noted that, in some embodiments, such indicators may also be used in display images, in particular cross-sectional images.

One or more example embodiments of the present invention also concerns a data processing device for performing at least one measurement in an anatomical vessel structure in an imaging region, the vessel structure comprising multiple vessels of interest for the measurement, wherein the data processing device comprises:

- a display device,
- an interface for receiving a three-dimensional image data set of the imaging region,
- an unfolding unit for, from the image data set, determining a two-dimensional unfolded image of the vessel structure,
- a display unit for displaying the unfolded image to the user on the display device,
- a landmark unit for determining at least one landmark in the vessel structure and visualizing the at least one landmark at a corresponding landmark position in the unfolded image, and
- a measurement unit for performing the at least one measurement based on the at least one landmark and the three-dimensional image data set,
- wherein the display unit is further configured to display the result of the at least one measurement in or together with the unfolded image in a user presentation on the display device.

In other words, the data processing device may be configured to perform a method according to one or more example embodiments of the present invention. All comments, remarks and features discussed regarding the method according to one or more example embodiments of the present invention analogously apply to the data processing device according to one or more example embodiments of the present invention, such that the same advantages may be achieved. In embodiments, the data processing device may comprise at least one processor and/or at least one storage means. The functional units mentioned above may be formed by using corresponding software and/or hardware components, in particular of or running on the at least one processor.

Preferably, the data processing device further comprises:

- an evaluation unit for determining vessel structure information describing the course and/or dimensions of the vessels of interest from the image data set by at least one evaluation algorithm, wherein the unfolding unit is configured to use at least a part of the vessel structure information for determining the unfolded image and/or the measurement unit is configured to use at least a part of the vessel structure information for performing the measurement, and/or a user input device and a user interaction unit for determining user interaction data of a user interaction with the unfolded image, wherein the landmark unit is configured to use the user interaction data to determine the at least one landmark, and/or for determining user modification information regarding at least one displayed landmark position and/or displayed vessel structure information and determined from interaction of the user therewith in the user presentation, wherein a modification unit of the data processing device is configured to modify the at least one displayed landmark position and/or displayed vessel structure information according to the user modification information.

A computer program according to one or more example embodiments of the present invention can be directly loaded into a storage means of a data processing device and comprises program means such that, when the computer program is executed on the data processing device, the steps of a method according to one or more example embodiments of the present invention are performed. The computer program may be stored on an electronically readable storage medium according to one or more example embodiments of the present invention, which thus comprises control information comprising a computer program according to one or more example embodiments of the present invention, such that, when the electronically readable storage medium is used in a data processing device, the data processing device performs a method according to the invention. The electronically readable storage medium may in particular be a non-transitional storage medium, for example a CD-ROM.

FIG. 1 is a flowchart of an embodiment of a method according to the invention. In this embodiment, a method for pre-procedural planning of abdominal aortic aneurysm stent placement interventional procedures will be described as an exemplary use-case, however, the concepts described herein are not so limited and can be applied to other use-cases as well, for example pre-procedural planning regarding other implants or generally interventional procedures.

To select or customize a suitable implant, in this case a stent, information regarding the dimensions of the aneurysm, the aorta, the renal vessels and the left and right run-offs is required, which will be measured in a three-dimensional image data set, which is received in a step S1. At least the aorta, the renal vessels and the left and right run-offs are vessels of interest in this case, forming a complex three-dimensional vessel structure which is part of the blood vessel tree of the patient. The image data set may, in particular, be an angiography data set of an imaging region comprising this vessel structure, in this case the abdomen of the respective patient, which has been acquired using a contrast agent. In particular, the three-dimensional image data set may be a computed tomography angiography data set.

In step S2, using a first evaluation algorithm, the centerlines of the blood vessels of interest are automatically extracted by evaluating the three-dimensional image data set. For example, using a CT angiography scan as input, the major blood vessels contained therein may be automatically extracted and converted to centerlines representing their course in three-dimensional space. For example, the first evaluation algorithm may be a centerline tracing algorithm, wherein centerlines are traced between automatically detected landmarks. In this concrete embodiment, the aorta, the renal vessels and the run-off vessels are automatically extracted and their centerlines are determined. It is noted that, if not all centerlines can be found automatically using the first evaluation algorithm, further centerlines may be added interactively by a user in a corresponding display of the three-dimensional image data set.

In a step S3, the results of step S2 are used to determine an unfolded image of the vessel structure. In this embodiment, generally said, the set of detected centerlines is used to project all vessels of interest as well as at least a part of the surrounding anatomy into a single planar view, that is, the two-dimensional unfolded image. In particular, the centerlines, which form vessel structure information, are used to select a set of input points in the three-dimensional image data set, which are projected onto a projection surface to calculate a set of surface points on the projection surface. In this case, the projection surface may be flat, while in other cases, for example when considering the heart, may also have other shapes, for example a shape enclosing or mimicking at least essentially the heart shape. Using a deformation algorithm, the projection surface can be deformed such that the surface points lie on the input points on a deformed projection surface, which defines a set of voxel positions such that the two-dimensional unfolded image of the vessel structure can be determined based on the three-dimensional image data set and the set of voxel positions. In particular, approaches as described in EP 3 828 836 A1 may be employed.

The unfolded image, which may be seen as a conceptual extension of CPRs, provides a comprehensive overview of the vascular anatomy of the vessel structure and the surrounding anatomy, which may be, at least in part, excluded from the creation of the unfolded image, for example in the case of vessels not of interest, which may instead be indicated using a corresponding indicator, for example a dotted line indicating their course. Of course, the unfolded image also shows pathologies which may be object of the interventional procedure, in this case the aneurysm.

The unfolded image forms the basis of a user presentation in a user interface, which provides interactive control by a user and documentation regarding the measurements, as further discussed below.

However, before the user presentation is displayed, in a step 4, further vessel structure information (additional to the centerlines) is determined using at least one second evaluation algorithm. In this concrete embodiment, a lumen information is determined by segmenting the lumen of the vessels of interest. In this manner, a quantification of the diameters of the vessels of interest is enabled. For example, an algorithm as described in U.S. Pat. No. 8,620,040 B2 may be employed.

In this embodiment, healthy and diseased areas are segmented, in particular to also cover the disease to be evaluated, that is, the aneurysm. Here, the second evaluation algorithm also segments the outline of the aortic aneurysm thrombus region. Not only the diameter of the patent lumen can thus be quantified, but the entire aneurysm sac including the thrombus formation within the sac. This is in particular relevant for the landing zones, as measuring only the patent vessel lumen might result in the selection of an undersized stent or stent graft, which could lead to migration of the stent in the worst case.

In an optional step S5, a landmark detection algorithm may be applied to automatically determine at least a part of landmarks required to perform the measurements. It should be noted at this point that the at least one measurement to be performed is defined based on manufacturer-specific requirement data describing measurement information required to determine the parameters of the stent or stent graft. For example, some manufacturers provide forms indicating required measurements to either select a suitable implant or be able to provide a customized patient-specific implant. The set of landmarks required for the measurement depend on the involved vessels of interest and the procedure to be planned. In this concrete embodiment, for example, twelve landmarks may be covered, four in the aorta (at least one defined by the position of the ostia of the left and right renal vessels), four in the left run-off and four in the right run-off. Of course, other configurations may be considered.

In a step S6, the user presentation is generated and displayed to the user using a display device, for example a monitor of a data processing device, in particular a PACS work station. The user presentation comprises at least the unfolded image, wherein, if landmarks have been automatically determined in optional step S5, also display images, in this case cross-sectional images of the respective vessel of interest at the landmark position, are determined and also displayed adjacent to the unfolded image. The cross-sections may be determined perpendicular to the centerline. In the unfolded image, the positions of the landmarks are also shown, as well as at least a part of the vessel structure information, in this case the centerlines. In the display images, the contours of the vessel according to the lumen information is shown.

In a step S7, if the required landmarks are already available, measurements are performed and the results also shown in the user presentation. Measurements, in this case, may comprise lengths of vessels of interest between landmark positions along the centerlines, diameters of the vessels at the landmarks and the like. This is, generally said, vessel structure information is used to perform the measurements in the three-dimensional image data set.

In a step S8, the user may interact with the user presentation. To this end, a user input device is provided, for example a keyboard, a mouse or by implementing the display device as a touchscreen. Generally said, a user interface comprising the user presentation is implemented, which can be used to set landmarks or modify landmark positions and/or vessel structure information. For example, if landmarks have not been automatically determined in step S5 or additional landmarks are to be placed, user interaction information of user interaction with the unfolded image is received and evaluated to place a new landmark in step S9. In the case of a modification, user modification information is received, for example describing a re-placement or shifting of a landmark or modification of vessel structure information, for example the boundary in a display image. For example, the user may interact with the user presentation by grabbing elements and moving them, as for example a landmark or a section of a contour. If user modification information is received in step S8, in step S9, the respective modifications are performed. If a new landmark has been defined, the corresponding display image is instantly generated in step S6 and displayed; if modifications on landmark positions and/or vessel structure information is performed, the display image is automatically updated as well as the displayed vessel structure information and landmark position. Furthermore, if applicable, measurements are updated and the updated results are shown in step S7.

Figure 2:
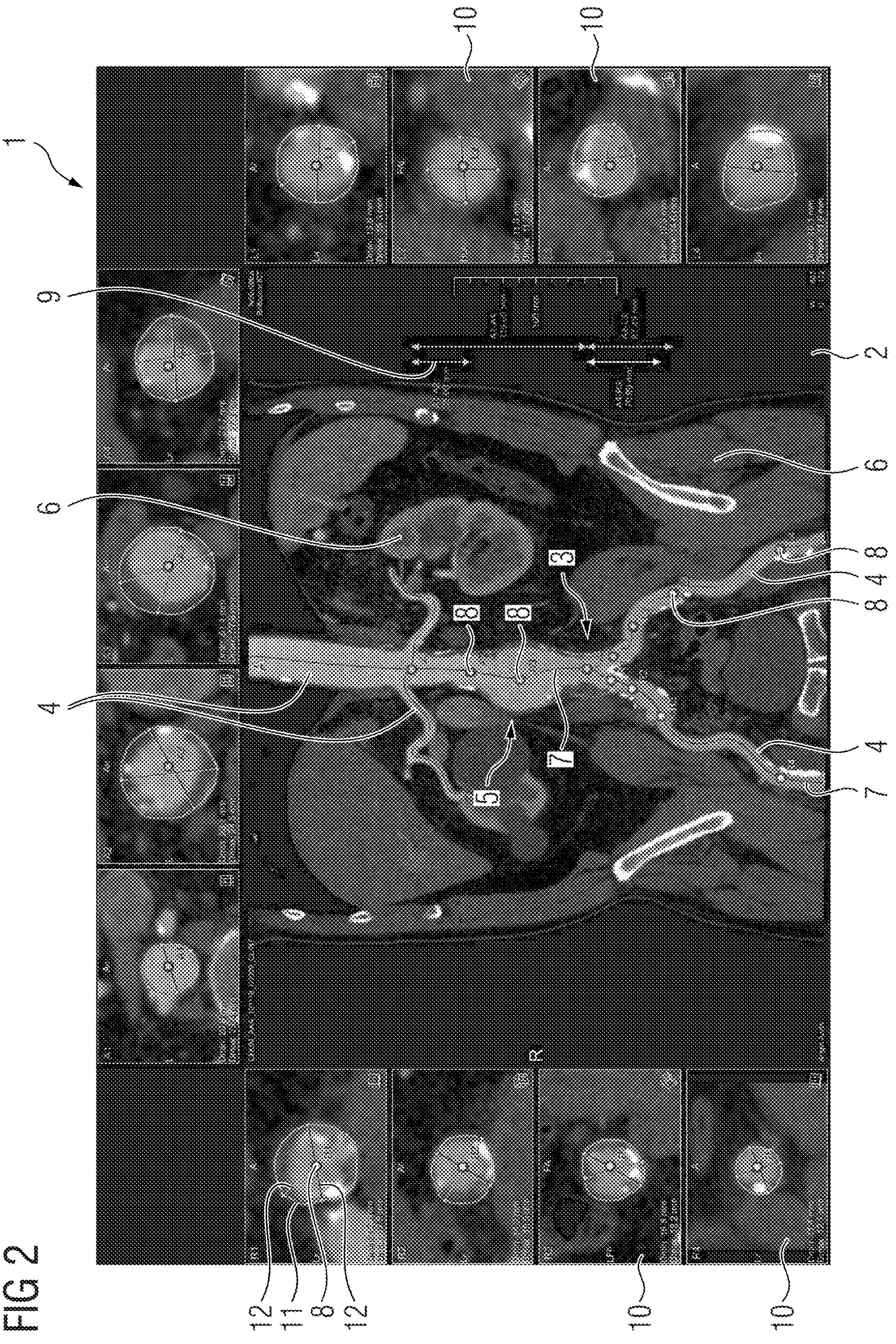
FIG. 2 schematically a user presentation.

FIG. 2 schematically shows an exemplary user presentation 1. The user presentation 1 comprises in a central, large section the unfolded image 2 showing the vessel structure 3 with its vessels 4 of interest. In particular, in this concrete embodiment, in the lower part of the unfolded image 2, the left and right run-offs from the centrally placed aorta are shown, in the upper part the left and right renal vessels. The aneurysm 5 is clearly discernable. Surrounding anatomy 6 can also be seen. Inside the vessels 4 of interest, the centerlines 7 are displayed with the landmarks 8 placed on them. On the right in the unfolded image 2, measurement results 9 are indicated, in this case lengths between certain landmarks 8 along the centerlines 7 in the three-dimensional image data set.

For each landmark 8, a respective display image 10 is shown adjacent to the unfolded image 2, in this case at least partly surrounding the unfolded image 2. The display images 10 are, as already explained, cross-sectional images showing a cross section of the respective vessel 4 of interest at the respective landmark 8 and additionally the contours 11 according to the lumen information. Further, in the display images 10, measurement results relating to the corresponding landmark 8 are shown, in this case the largest and smallest diameters 12. Additionally, an average diameter can be determined and also be shown in the respective display image 10.

The user presentation 1 hence provides a comprehensive overview regarding all the measurements and their basis. This single view not only serves as a user interface for interaction and modification, as described above, but also for documentation and communication of the measurements. Hence, returning to FIG. 1, if, in a step S10, a finalizing user command is received in a step S11, the user presentation 1 together with the measurement results are stored as a report. On the basis of this report, in a step S12, planning data, in this case comprising parameters describing the stent or stent graft to be implanted, may be determined based on the results.

Figure 3:
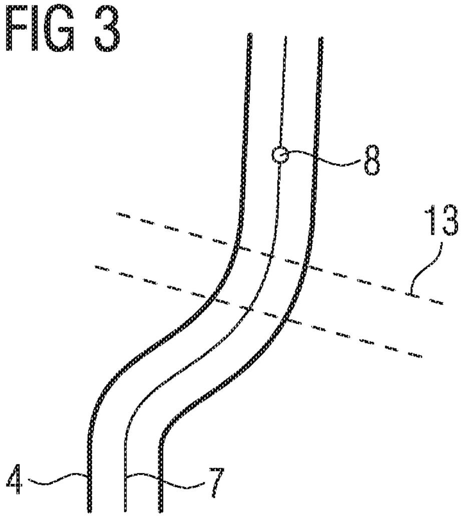
FIG. 3 a detail of a user presentation in an embodiment.

FIG. 3 shows a detail of an unfolded image 2, wherein an additional anatomical structure, in this case a vessel not of interest, has been removed from the three-dimensional image data set when creating the unfolded image 2 to avoid confusion, since it crosses a vessel 4 of interest and/or might result in other artifacts. However, the vessel not of interest has been segmented such that an indicator 13, in this case dotted lines indicating the course, can be included into the user presentation 1 to provide information regarding this vessel. In the concrete embodiment discussed here, the vessel not of interest may be the internal iliac.

Figure 4:
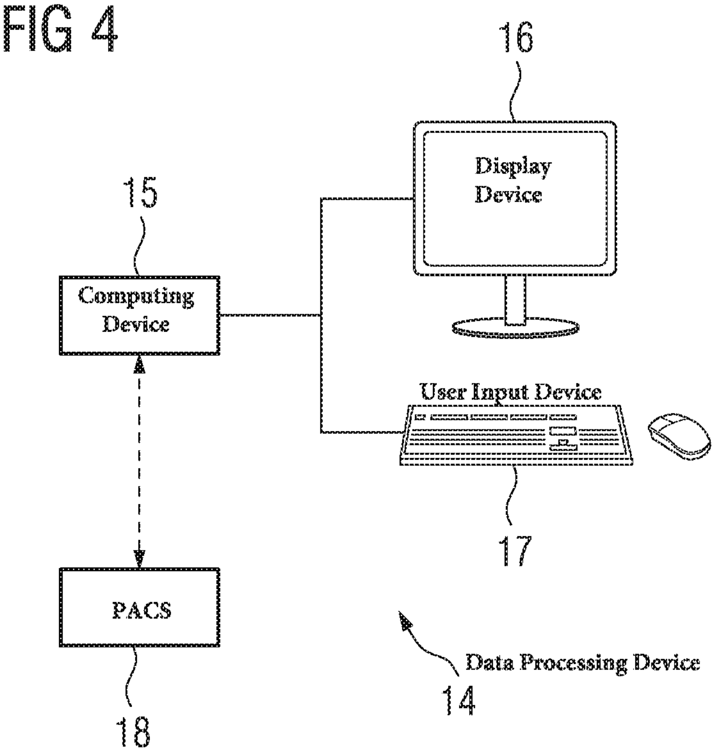
FIG. 4 a data processing device according to an example embodiment of the invention, and FIG. 5 the functional structure of a computing device of the data processing device according to an example embodiment of the invention.

FIG. 4 shows a principle drawing of a data processing device 14 according to one or more example embodiments of the present invention. The data processing device 14 comprises a computing device 15 having at least one processor and at least one storage means, a display device 16, for example a monitor, and a user input device 17, for example a keyboard and/or a mouse and/or a touchscreen. In the latter case, the input device 17 is at least partly integrated into the display device 16.

In this embodiment, the data processing device 14 is a PACS work station communicating with a PACS 18 (picture archiving and communication system).

Figure 5:
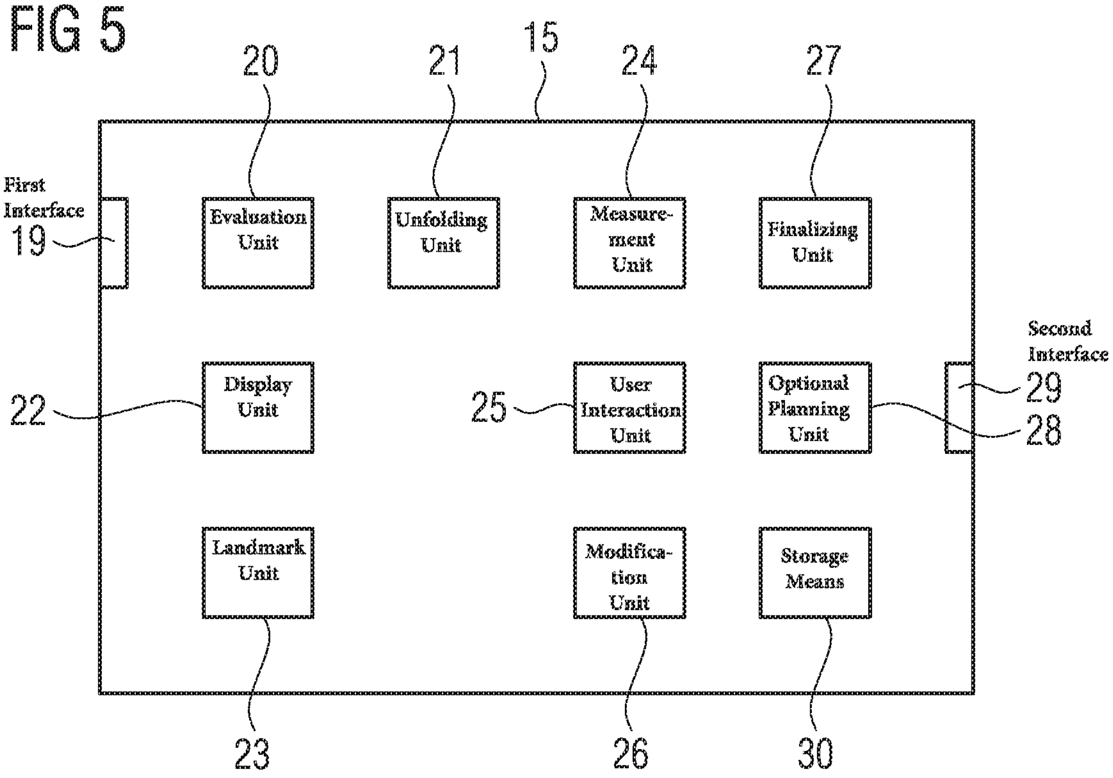

FIG. 5 shows the functional structure of the computing device 15, wherein functional units may be implemented using hardware and/or software components. In particular, the functional units may be provided by a computer program according to one or more example embodiments of the present invention.

The computing device 15 comprises a first interface 19 for receiving the three-dimensional image data set, in particular from the PACS 18, according to step S1. In an evaluation unit 20, the three-dimensional image data set can be evaluated by evaluation algorithms to yield vessel structure information, for example as discussed above with regard to steps S2 and S4. A part of the vessel structure information, in particular the centerlines 7, may be used in an unfolding unit 21 to determine the unfolded image 2, for example as described with regard to step S3.

In a display unit 22, the user presentation 1 is generated and displayed using the display device 16, see step S6. In a landmark unit 23, the at least one landmark 8 is determined and visualized in the user presentation 1 according to the optional step S5 and partly step S9 relating to the user interaction information.

The computing device 15 further comprises a measurement unit 24 for performing the measurements according to step S7, as well as a user interaction unit 25 for determining the user interaction information and/or the user modification information according to step S8, wherein, according to step S9, a modification unit 26 may execute the corresponding modifications.

Additional units may comprise a finalizing unit 27 for performing the steps S10 and S11 and an optional planning unit 28 for performing the step S12, which may also be performed externally, for example at another data processing device of a person receiving the report. For outputting data, in particular the report and/or the planning data, a second interface 29 is provided.

In the computing device 15, data may be stored in a storage means 30. Such data may comprise the three-dimensional image data set, vessel structure information, display images 10, reports and planning data.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing system or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules.

Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents Although the present invention has been described in detail with reference to one or more example embodiments, the present invention is not limited by the disclosed examples from which the skilled person is able to derive other variations without departing from the scope of the invention.

We claim:

1. A computer-implemented method for performing at least one measurement in an anatomical vessel structure in an imaging region, the anatomical vessel structure comprising multiple vessels of interest for the measurement, the method comprising:

receiving a three-dimensional image data set of the imaging region;

determining a combined two-dimensional unfolded image of the vessel structure from the image data set, the combined two-dimensional unfolded image including an unfolded image and at least a part of at least one of a surrounding anatomy in the imaging region or a surrounding anatomy for at least one additional anatomical structure, the unfolded image being an image displaying the multiple vessels of interest in the anatomical vessel structure two-dimensionally without overlapping, and the determining the combined two-dimensional unfolded image including determining the unfolded image by excluding the at least the part of at least one of the surrounding anatomy in the imaging region or the surrounding anatomy for the at least one additional anatomical structure, and overlaying at least one indicator describing at least one of a position or dimensions of the at least the part of at least one of the surrounding anatomy in the imaging region or the surrounding anatomy for the at least one additional anatomical structure over the unfolded image;

displaying the combined two-dimensional unfolded image;

determining at least one landmark in the vessel structure and visualizing the at least one landmark at a corresponding landmark position in the combined two-dimensional unfolded image;

performing the at least one measurement based on the at least one landmark and the three-dimensional image data set; and displaying a result of the at least one measurement in the combined two-dimensional unfolded image in a user presentation or together with the combined two-dimensional unfolded image in the user presentation.

2. The computer-implemented method of claim 1, wherein the determining the at least one landmark determines the at least one landmark at least partly based on at least one of user interaction data of a user interaction with the unfolded image or by a landmark detection algorithm.

3. The computer-implemented method of claim 1, further comprising:

determining vessel structure information using at least one evaluation algorithm, the vessel structure information describing at least one of a course of the vessels of interest or dimensions of the vessels of interest from the image data set, wherein at least one of the determining the unfolded image or the performing the measurement is at least partly based on the vessel structure information.

4. The computer-implemented method of claim 3, wherein the determining vessel structure information includes determining at least one of, centerlines of the vessels of interest, or a lumen information describing a lumen of the vessels of interest.

5. The computer-implemented method of claim 4, wherein the at least one measurement relates to at least one disease, wherein the lumen information is determined based on a presence of the at least one disease.

6. The computer-implemented method of claim 3, further comprising:

displaying at least a part of the vessel structure information in the combined two-dimensional unfolded image.

7. The computer-implemented method of claim 1, further comprising:

determining, for at least one landmark, at least one additional two-dimensional display image at the landmark position; and displaying the at least one additional two-dimensional display image adjacent to the combined two-dimensional unfolded image in the user presentation.

8. The computer-implemented method of claim 7, wherein the at least one additional two-dimensional display image is a sectional image of the vessel of interest in which the landmark is located.

9. The computer-implemented method of claim 7, wherein a result of the at least one measurement is related to vessel structure information, derived from the image data set and underlying the at least one measurement at the landmark.

10. The computer-implemented method of claim 1, further comprising:

modifying at least one of at least one displayed landmark position or displayed vessel structure information based on user modification information determined from interaction of a user with the user presentation.

11. The computer-implemented method of claim 10, wherein the modifying includes updating each of the at least one measurement based on at least one of the respective landmark or vessel structure information.

12. The computer-implemented method of claim 1, wherein the determining the unfolded image includes, selecting a set of input points in the three-dimensional image data set, wherein the set of input points comprises a first plurality of input points that represents the vessel structure, determining a projection surface with respect to the three-dimensional image data set, calculating a set of surface points of the projection surface, wherein for each input point of the set of input points, a corresponding surface point of the set of surface points is calculated based on a projection of the corresponding input point onto the projection surface, calculating a deformed projection surface by applying a deformation algorithm onto the projection surface, the set of input points and the set of surface points, wherein each surface point of the set of surface points is moved to the corresponding input point of the set of input points, calculating a set of voxel positions with respect to the three-dimensional image data based on the deformed projection surface, and calculating the unfolded image based on the three-dimensional image data set and the set of voxel positions.

13. The computer-implemented method of claim 1, wherein the additional anatomical structure is a vessel not of interest for the at least one measurement, the vessel not of interest overlaps or crosses at least one of the vessels of interest of the vessel structure, and the indicator describes at least one of a course of the vessel not of interest or dimensions of the vessel not of interest.

14. A data processing device for performing at least one measurement in an anatomical vessel structure in an imaging region, the vessel structure comprising multiple vessels of interest for the measurement, the data processing device comprising:

a display;

an interface configured to receive a three-dimensional image data set of the imaging region;

a memory; and processing circuitry configured to cause the data processing device to determine a combined two-dimensional unfolded image of the vessel structure from the image data set, by determining an unfolded image by excluding at least a part of at least one of a surrounding anatomy in the imaging region or a surrounding anatomy for at least one additional anatomical structure, and overlaying at least one indicator describing at least one of a position or dimensions of the at least the part of at least one of the surrounding anatomy in the imaging region or the surrounding anatomy for the at least one additional anatomical structure over the unfolded image, wherein the unfolded image is an image displaying the multiple vessels of interest in the anatomical vessel structure two-dimensionally without overlapping, and the combined two-dimensional unfolded image includes the unfolded image and the at least the part of at least one of the surrounding anatomy in the imaging region or the surrounding anatomy for the at least one additional anatomical structure, display, on the display, the combined two-dimensional unfolded image, determine at least one landmark in the vessel structure and visualize the at least one landmark at a corresponding landmark position in the combined two-dimensional unfolded image, perform the at least one measurement based on the at least one landmark and the three-dimensional image data set, and display a result of the at least one measurement in the combined two-dimensional unfolded image in a user presentation or together with the combined two-dimensional unfolded image in the user presentation.

15. The data processing device of claim 14, wherein the processing circuitry is further configured to cause the device to at least one of:

determine vessel structure information describing at least one of a course of the vessels of interest or dimensions of the vessels of interest from the image data set using at least one evaluation algorithm, and at least one of (i) use at least a part of the vessel structure information for determining the unfolded image or (ii) use at least a part of the vessel structure information for performing the measurement; or determine user interaction data of a user interaction with the combined two-dimensional unfolded image, use the user interaction data to determine at least one of the at least one landmark, user modification information regarding at least one displayed landmark position, or displayed vessel structure information and determined from interaction of a user with the user presentation, and modify at least one of the at least one landmark position or the displayed vessel structure information according to the user modification information.

16. A non-transitory computer readable medium having instructions that, when executed by a data processing device of a system, cause the system to perform the method of claim 1.

17. A non-transitory computer readable medium having instructions that, when executed by a data processing device of a system, cause the system to perform the method of claim 2.

18. The computer-implemented method of claim 3, further comprising:

determining, for at least one landmark, at least one additional two-dimensional display image at the landmark position; and displaying the at least one additional two-dimensional display image adjacent to the combined two-dimensional unfolded image in the user presentation.

19. The computer-implemented method of claim 4, further comprising:

determining, for at least one landmark, at least one additional two-dimensional display image at the landmark position; and displaying the at least one additional two-dimensional display image adjacent to the combined two-dimensional unfolded image in the user presentation.

20. The computer-implemented method of claim 1, wherein the unfolded image is a single image displaying a global view of the anatomical vessel structure.

21. The computer-implemented method of claim 1, wherein the unfolded image is a global view of the anatomical vessel structure.

* * * * *